United States Patent [19]
Van Wandelen

[11] 4,124,292
[45] Nov. 7, 1978

[54] LIGHT SOURCE FOR PHOTOGRAPHIC COLOR PRINTERS

[76] Inventor: Henri Van Wandelen, 716 Tamarack Ave., San Carlos, Calif. 94070

[21] Appl. No.: 839,973

[22] Filed: Oct. 6, 1977

[51] Int. Cl.² .................... G03B 27/54; G03B 27/76
[52] U.S. Cl. ........................................ 355/37; 355/70
[58] Field of Search .................... 355/37, 38, 70, 71

[56] References Cited

U.S. PATENT DOCUMENTS

| | | | |
|---|---|---|---|
| 3,120,782 | 2/1964 | Goddard et al. | 355/38 |
| 3,371,575 | 3/1968 | Simmon | 355/70 |
| 3,482,915 | 12/1969 | Corley | 355/37 |
| 3,488,117 | 1/1970 | Weisglass | 355/37 |
| 3,492,070 | 1/1970 | Zahn | 355/37 |
| 3,630,609 | 12/1971 | Clapp et al. | 355/37 |
| 3,684,371 | 8/1972 | Weisglass et al. | 355/37 X |
| 3,897,147 | 7/1975 | Simon | 355/37 |

Primary Examiner—Richard A. Wintercorn

[57] ABSTRACT

A light source including a plurality of different individual lamps providing primary colors. A mirror which selectively reflects is associated with each lamp. The mirror reflects the corresponding primary color through a filter into a color mixing chamber which provides light having predetermined color composition. A photocell sensing system senses the light in the mixing chamber to provide electrical signals corresponding to the intensity of each color. The signals are employed in a color composition control system for controlling the intensity of the individual light lamps.

14 Claims, 8 Drawing Figures

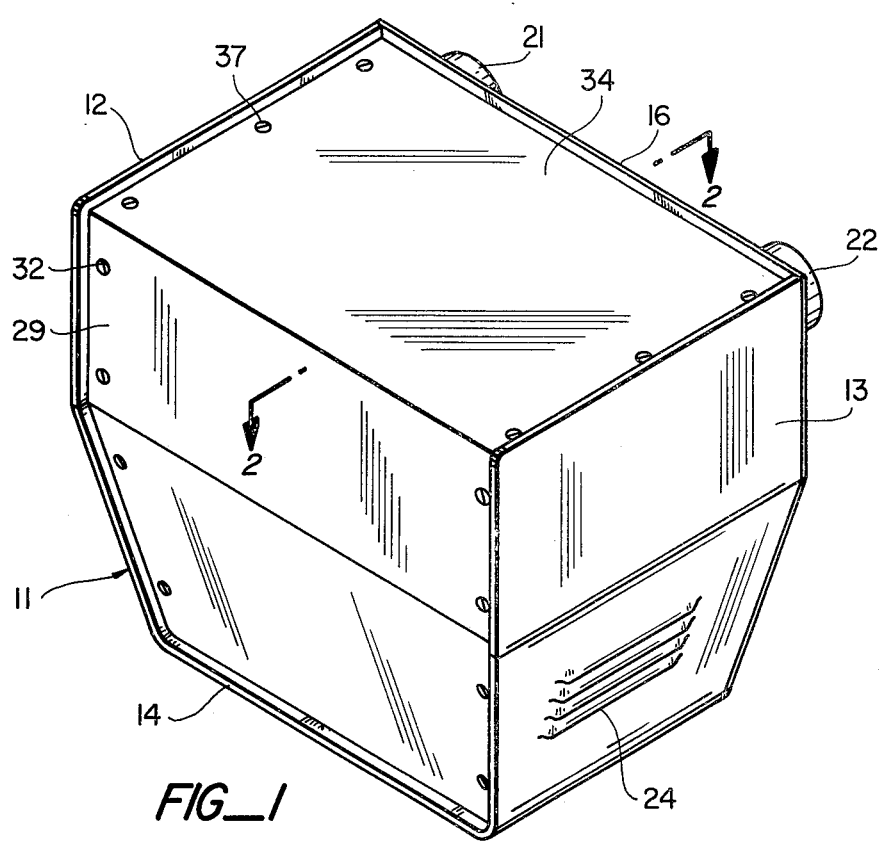
FIG_1
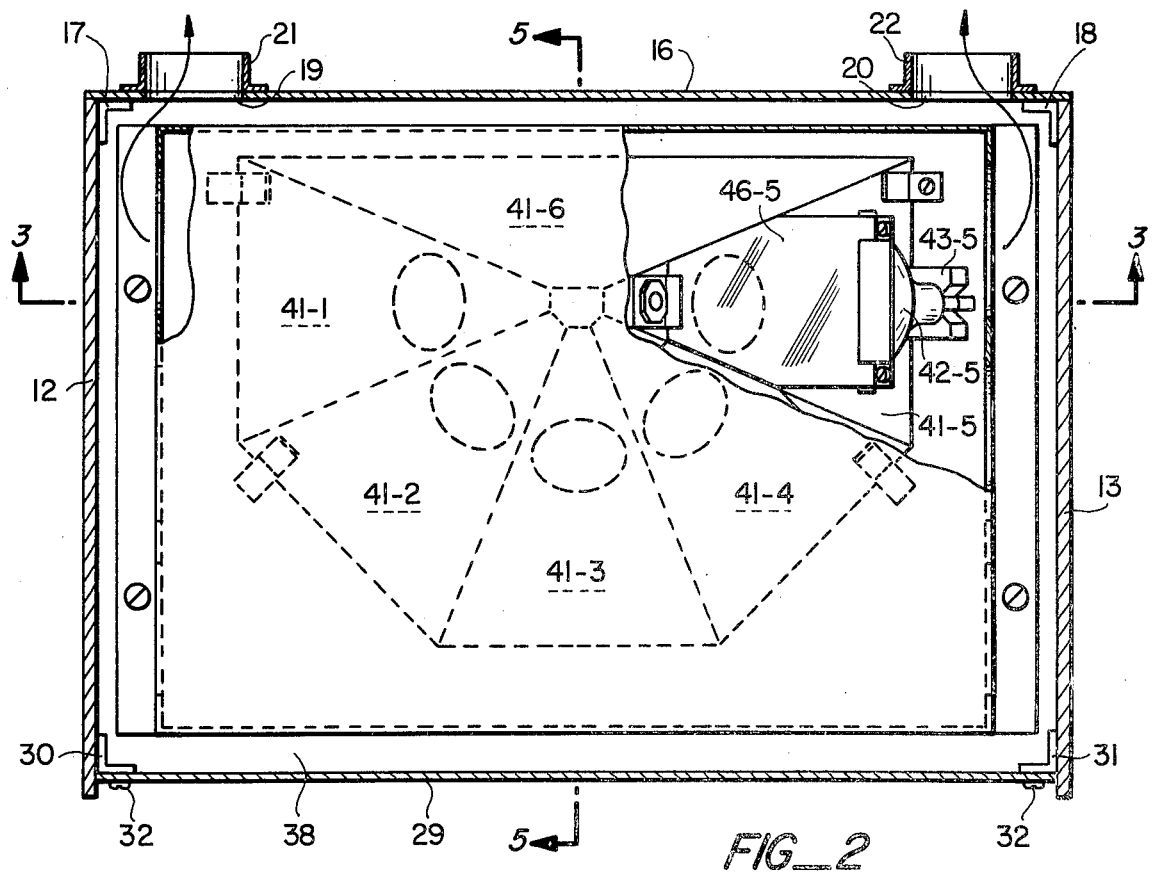
FIG_2

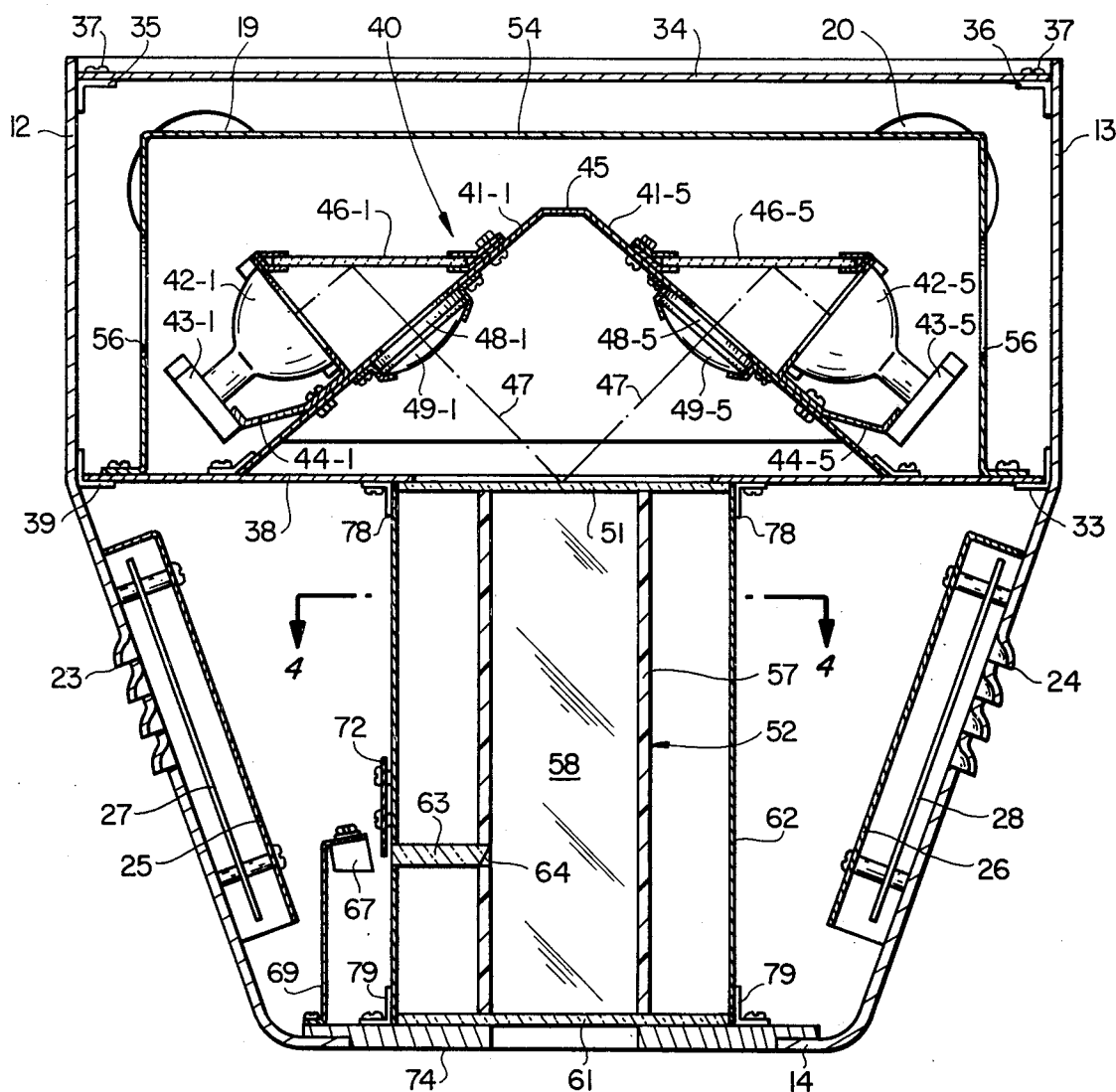
FIG_3
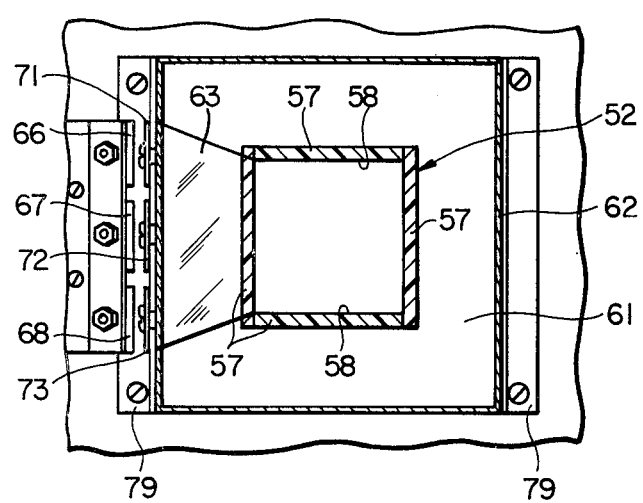
FIG_4

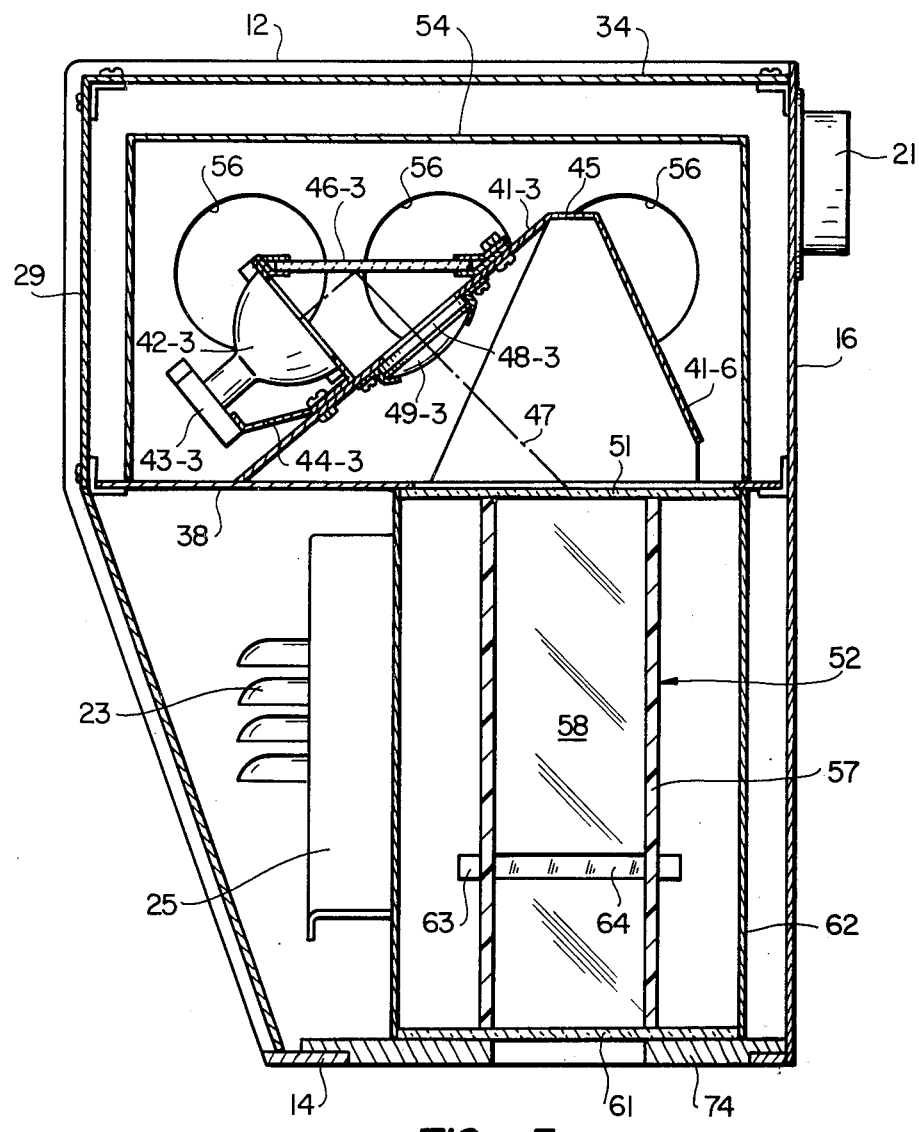
FIG_5
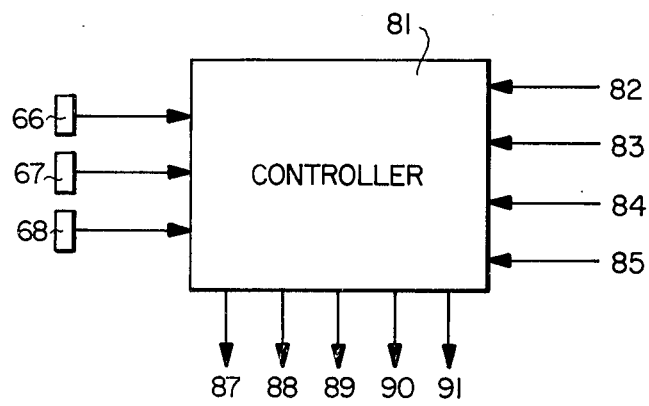
FIG_6

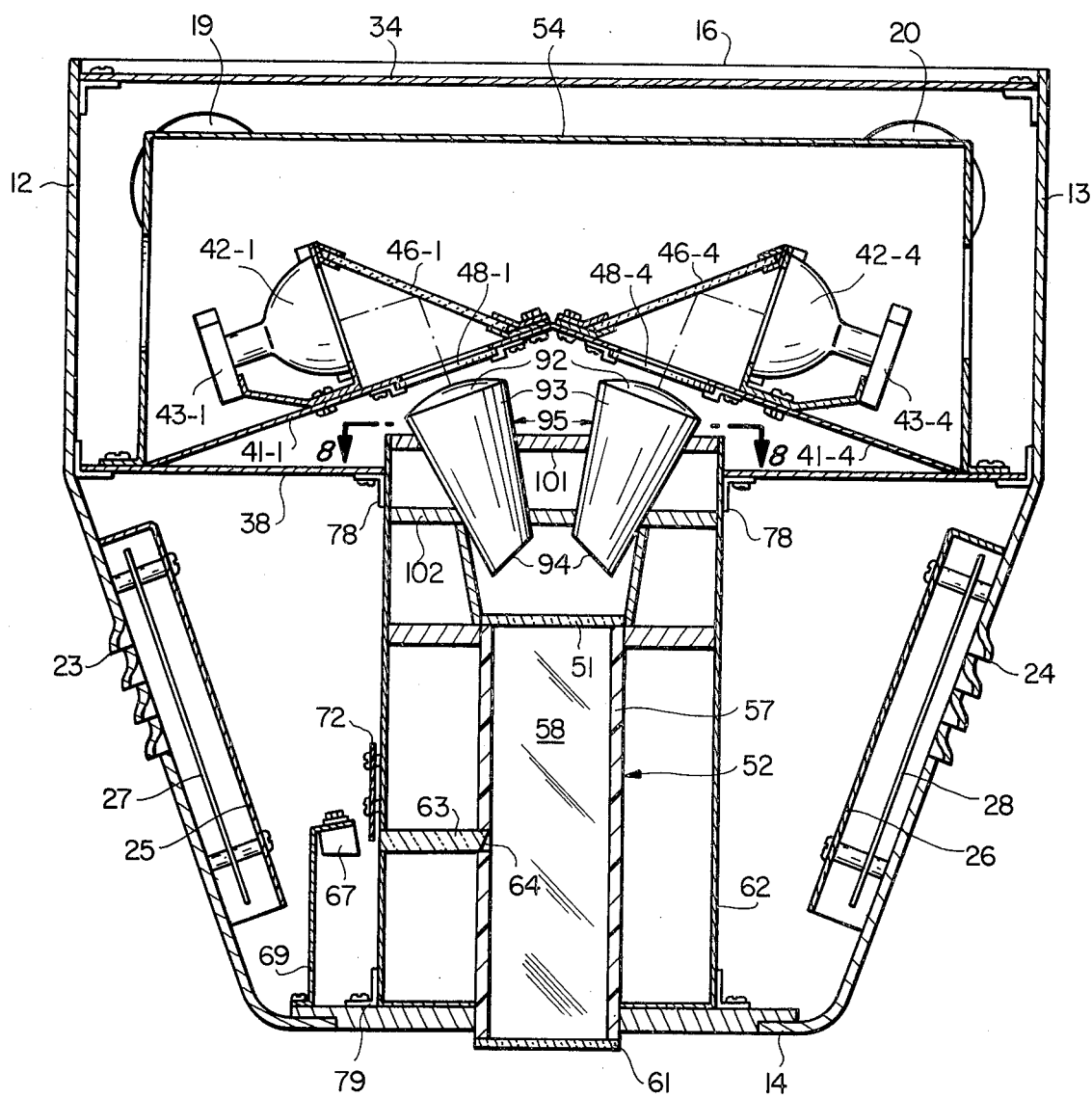
FIG_7
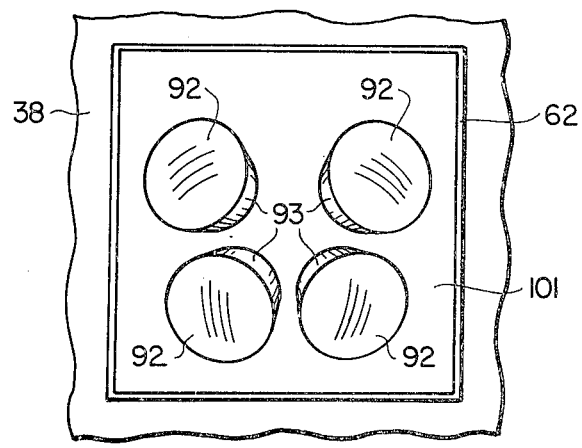
FIG_8

LIGHT SOURCE FOR PHOTOGRAPHIC COLOR PRINTERS

BACKGROUND OF THE INVENTION

This invention relates generally to a light source for photographic printers and more particularly to an additive light source for color printers.

Various light sources have been used in printing apparatus for providing printing light of proper color composition. For example, a strong white light source may be employed together with successive color filters which pass light in a selected color band. The filtered light combines to provide the proper color composition. Other systems employ lamps providing the three primary colors. The light is filtered as it is directed into a mixing chamber. The intensity of the lamps is controlled to provide light of proper composition.

Mixing chambers have taken various forms. Mixing chambers having diffuse surfaces have been used as well as mixing chambers having highly reflective surfaces. It is also known to provide mixing chambers of various sizes to accommodate negatives of different sizes.

In general, a single lamp for each of the primary colors is employed together with filters. The red sensitive layers in the photographic emulsion of the printing papers are less sensitive than are the green or blue layers. As a result, exposure time is necessarily increased in order to properly expose the red colors. The result is that there is a need for slope control circuits to prevent color shift between prints made with different exposure times and having different color compositions.

OBJECTS AND SUMMARY OF THE INVENTION

It is a general object of the present invention to provide an improved light source for photographic printers.

It is another object of the present invention to provide a light source which permits the use of high power lamps to provide a high intensity light source.

It is another object of the present invention to provide a light source in which a plurality of red lamps are provided together with green and blue lamps so that the source can be used with full intensity of the green and blue lamps and still obtain suitable color composition.

It is another object of the present invention to provide a light source for photographic printers which employs as light pipe a combination lens, light pipes and prism to receive the light from the lamps and concentrate the light onto a diffusing plate at the end of a mixing chamber.

It is a further object of the present invention to provide a light source which provides light of desired composition at sufficient intensity that the light can be controlled to provide a single exposure time for all negatives to thereby eliminate the need for slope control.

It is a further object of the present invention to provide an additive light source which employs a yellow lamp in place of the green lamp whereby the red sensitive layers in photographic emulsions receive an added amount of light equivalent to the amount of green light needed to satisfy the green control circuit.

The foregoing and other objects of the invention are achieved by a light source including a plurality of individual lamps providing white light at high intensity, a mirror associated with each of the lamps for reflecting light from said lamps, each of said mirrors serving to selectively reflect light corresponding to a predetermined color, a filter associated with each of said mirrors serving to receive, filter and pass the reflected light, said mirrors protecting said filters by passing radiation of unwanted color and reflecting light of desired color to thereby permit the use of high intensity lamps, and a mixing chamber adapted to receive the light passed by said filters and mix the same to provide light of predetermined composition. The invention also contemplates the use of a plurality of lamps associated with red reflecting mirrors and filters to thereby increase the intensity of the red light directed into the mixing chamber to permit operation of the green and blue lamps at higher levels than in a light source having only one red mirror and filter.

BRIEF DESCRIPTION OF THE FIGURES

FIG. 1 is a perspective view of a light source in accordance with the invention.

FIG. 2 is a partial sectional view taken along the line 2—2 of FIG. 1.

FIG. 3 is a sectional view taken along the line 3—3 of FIG. 2.

FIG. 4 is a sectional view taken along the line 4—4 of FIG. 3.

FIG. 5 is a sectional view taken along the line 5—5 of FIG. 2.

FIG. 6 is a block diagram of the control circuits associated with the light source.

FIG. 7 is an elevational sectional view showing another embodiment of the invention.

FIG. 8 is a view taken generally along the lines 8—8 of FIG. 7.

DESCRIPTION OF PREFERRED EMBODIMENTS

The light source includes a sheet metal outer housing 11 having side walls 12 and 13 and bottom wall 14 formed of a sheet of metal. A back wall 16 is suitably secured to the side wall by means of angle brackets 17 and 18 attached to the two walls as, for example, by welding. The back wall includes spaced openings 19 and 20 provided with flanges 21 and 22 adapted to be connected to suitable fans by flexible conduit for circulating air through the housing 11. The side walls 12 and 13 are provided with louvers 23 and 24, respectively, which permit the flow of air inwardly into the housing. Baffles 25 and 26 are disposed adjacent the louvers 23 and 24, respectively, and serve to direct air downwardly towards the bottom of the housing. Printed circuit boards 27 and 28 including control circuits may be mounted adjacent the louvers to be cooled by the circulating air.

A front wall 29 is secured to brackets 30 and 31 by means of suitable screws 32. Similarly, an upper cover 34 is secured to brackets 35 and 36 by means of screws 37. A mounting shelf or plate 38 is carried by spaced brackets 39 and 33 secured to the side wall at the point that the side wall is tapered inwardly. The mounting plate 38 mounts a lamp cone 40 which includes a plurality of flat surfaces 41 terminating in an apex 45. There are six flat surfaces 41-1 through 41-6 in the embodiment illustrated. Each of the flat surfaces 41-1 through 41-5 is adapted to mount a lamp 42. Lamps 42-1, 42-3 and 42-5 are shown. The lamps have their bases connected to the respective plugs 43, 43-1, 43-3 and 43-5 shown, and their faces supported by associated brackets 44 which also support the base as shown by the brackets 44-1, 44-3 and 44-5. Mirrors 46, 46-1, 46-3, and 46-5 are shown and are mounted in cooperative relationship with the light sources to reflect light as generally shown by the dotted beams 47. The mirrors are suitably mounted by brackets secured to the brackets 44 and the surfaces 41. The lamps associated with the surfaces 41-2 and 41-4 include similar mounting means. The light reflected from the mirrors is directed through openings formed on the surfaces 41. The light passes through associated filters 48 and lenses 49, filters 48-1, 48-3 and 48-5 and lenses 49-1, 49-3 and 49-5 are shown. The lenses focus the light upon a diffusing plate 51 carried at the top of a mixing chamber 52.

The light sources provide high intensity white light. The mirrors associated with each lamp are coated so as to reflect light of a particular color and pass other light. The mirrors reflect light corresponding to the pass band of the filters. The mirrors and filters cooperate to provide light at the primary colors, red, green and blue, to the mixing chamber. Use of the reflecting mirrors protects the filters in that undesired energy is passed by the mirrors and only energy of a color corresponding to the pass band of the filters impinges on the filters.

The light source and associated structure mounted on the cone is placed within a plenum 54 having openings 56 for the flow of cooling air therethrough and through the outlets 19 and 20.

As just described, the light of selected wavelength from each of the lamps impinges on a diffusion plate 51 associated with a mixing chamber 52. The mixing chamber comprises four plastic mirrors 57 jointed to one another to form a rectangular opening and having their reflective inner surfaces 58 whereby light passing through the diffusion plate 51 reflects between the mirrors and downwardly through the diffusion plate 61 at the bottom of the mixing chamber. The mixing chamber mirrors 57 and the diffusion plates 51 and 61 are supported by outer housing 62.

The light in the mixing chamber is intercepted and sampled by a prism which includes a transparent plate 63 having an inclined end 64 which intercepts light impinging downwardly from the diffusion plate 51 and transmits the light outwardly to associated photodetectors 66, 67 and 68 mounted on a bracket 69. The photodetectors are selected to respond to the three primary colors thereby giving an indication of each of the primary colors within the mixing chamber. Different mixing chambers are calibrated by means of a plurality of separately adjusted knife edges 71, 72 and 73 cooperating with each of the photocells to thereby control the amount of light impinging upon the photocells from the plate 63.

The mixing chamber assembly is removably secured within the light housing between the wall 38 and the bottom plate 74 secured to the bottom 14; the assembly slides between upper and lower spaced brackets 78 and 79. The signals from the three photocells 66, 67 and 68 are applied to an electronic controller 81 which may be of conventional design. The controller is adapted to receive individual control signals 82, 83, 84 and 85 inserted by the operator after the film has been examined by associated apparatus. The controller compares the output from the photocells with the input signals from the transducers and serves to control the power applied to the individual lamps, as indicated by the arrows 87, 88, 89, 90 and 91.

Preferably, and in accordance with one feature of the invention, there are provided a multiplicity of lamps 42 associated with mirrors which reflect the red color and associated red filters, whereas there is provided a single lamp 42 associated with blue and green mirrors and filters. Thus, the intensity of the red light approaches the intensity of the green and blue light and provides for operation of the green and blue light sources at maximum rating. This provides high intensity light of proper composition to the output of the mixing chamber and thereby provides for a wide range of adjustment of light level so as to compensate for different films and eliminate the need for slope control circuits.

In accordance with another feature of the invention another yellow lamp is substituted for the green and the yellow lamp provides the required green light as well as red light.

Referring now particularly to FIGS. 7 and 8, there is shown another embodiment of the invention. Like reference numerals have been applied to like parts. In the light source of FIGS. 7 and 8, the mixing chamber is suitable for smaller negatives such as 35 mm and 110 mm. The system provides for concentration of the light from the light sources into the mixing chamber. For this purpose, there has been provided a plurality of light pipes 91 which include lens 92, tapered bodies 93 and prism 94 formed in a single transparent element which is disposed adjacent to the corresponding filter 48 and serves to concentrate the reflected and filtered light from the lamp onto the diffuser 51 at the end of the mixing chamber 52. The mixing chamber 52 extends beyond the bottom of the apparatus and includes a diffuser 61. The complete assembly is mounted within housing 62 which includes spaced plates 101 and 102 for mounting the plurality of light pipes 95. The light source provides high intensity light whereby it can be controlled to eliminate the need for slope control. In all other respects, the system works as described above.

Thus, there has been provided an improved light source of simple design and high intensity.

What is claimed is:

1. A light source for photographic printers comprising:
   a plurality of individual lamps each providing white light,
   a mirror associated with each of said lamps for reflecting light from said lamps into said mixing chamber, each of said mirrors serving to reflect light corresponding to a primary color,
   a filter associated with each mirror serving to receive, filter and pass the reflected light, said mirrors serving to protect said filter by passing unwanted radiation and thereby permitting the use of high intensity lamps, and
   a mixing chamber adapted to receive the light from said filters and additively mix the same to provide light of predetermined composition.

2. A light source as in claim 1 including at least four lamps with a mirror and filter associated therewith, at least two mirrors and filters serving to reflect and filter red light.

3. A light source as in claim 1 including a prism for sampling light in said mixing chamber and a plurality of phototransducers responsive to the primary colors disposed to receive light from said prism and provide signals representative of the intensity of the light of each primary color entering said chamber from the filters.

4. A light source as in claim 1 including means between said prism and each phototransducer for controlling the amount of light impinging upon the phototransducer.

5. A light source as in claim 1 including a plurality of tapered light pipes, one for each filter, serving to collect the light from the associated filter and direct the light into the mixing chamber.

6. A light source as in claim 5 in which said light pipes include an integral lens at the filter end and an integral prism at the other end.

7. A light source for photographic printers comprising:
 a housing,
 a plurality of individual lamps each providing white light,
 means for mounting said lamps in said housing,
 a plurality of mirrors, one for each lamp, mounted in said housing for receiving and reflecting the light from the associated lamp, each of said mirrors serving to reflect light corresponding to a primary color,
 a plurality of filters, one for each lamp and mirror, mounted in said housing to receive filters and pass the reflected light, and
 a mixing chamber mounted in said housing to receive the light from said filters, said mixing chambers including an input diffusion plate for receiving and diffusing the light from said filters, an output diffusion plate providing output light and a plurality of cooperating mirrors therebetween serving to mix the input light to provide composite output light.

8. A light source as in claim 7 in which said mixing chamber is removably mounted in said housing.

9. A light source as in claim 7 including a prism for sampling light in said mixing chamber and a plurality of phototransducers responsive to the primary colors disposed to receive light from said prism and provide signals representative of the intensity of the light of each primary color entering said chamber from the filters.

10. A light source as in claim 9 including means between said prism and each phototransducer for controlling the amount of light impinging upon the phototransducer.

11. A light source as in claim 7 including a plurality of tapered light pipes, one for each filter, serving to collect the light from the associated filter and direct the light into the mixing chamber.

12. A light source as in claim 11 in which said light pipes include an integral lens at the filter end and an integral prism at the other end.

13. A light source for photographic printers comprising:
 a housing;
 a plurality of individual lamps each providing white light;
 means for mounting said lamps in said housing;
 a plurality of mirrors, one for each lamp, mounted in said housing for receiving and reflecting the light from the associated lamp, each of said mirrors serving to reflect light corresponding to a selected wavelength;
 a plurality of filters, one for each lamp and mirror, mounted in said housing to receive, filter and pass the reflected light, and
 a mixing chamber mounted in said housing to receive the light from said filters, said mixing chamber including an input diffusion plate for receiving and diffusing the light from said filters, an output diffusion plate providing output light, and a plurality of cooperating mirrors therebetween serving to mix the input light to provide a composite output light.

14. A light source for photographic printers as in claim 13 in which at least one of said mirrors serves to reflect light in the yellow wavelengths to thereby provide both green and red light to the mixing chamber.

* * * * *